United States Patent
Guo et al.

(10) Patent No.: US 12,401,432 B2
(45) Date of Patent: Aug. 26, 2025

(54) METHOD FOR RECOMMENDING INSTALLATION POSITION OF BASE STATION, STORAGE MEDIUM, MOWER, AND MOBILE ELECTRONIC DEVICE

(71) Applicant: Willand (Beijing) Technology Co., LTD., Beijing (CN)

(72) Inventors: Ziwei Guo, Beijing (CN); Zichong Chen, Beijing (CN); Tianning Yu, Beijing (CN); Degan Lin, Beijing (CN); Shaoguang Zhang, Beijing (CN)

(73) Assignee: Willand (Beijing) Technology Co., LTD. (CN)

( * ) Notice: Subject to any disclaimer, the term of this patent is extended or adjusted under 35 U.S.C. 154(b) by 343 days.

(21) Appl. No.: 18/317,995

(22) Filed: May 16, 2023

(65) Prior Publication Data
US 2023/0421272 A1 Dec. 28, 2023

(30) Foreign Application Priority Data
Jun. 10, 2022 (CN) .......................... 202210650115.X (51) Int. Cl.
*H04B 17/20* (2015.01)
*H04B 17/15* (2015.01)

(52) U.S. Cl.
CPC ......... *H04B 17/253* (2023.05); *H04B 17/191* (2023.05); *H04B 17/252* (2023.05)

(58) Field of Classification Search
CPC ... H04B 17/253; H04B 17/252; H04B 17/191
See application file for complete search history.

(56) References Cited

U.S. PATENT DOCUMENTS

| | | | | |
|---|---|---|---|---|
| 2012/0265391 | A1* | 10/2012 | Letsky | G05D 1/0221 701/25 |
| 2020/0182995 | A1 | 6/2020 | Zeng et al. | |
| 2021/0341629 | A1 | 11/2021 | Kishimoto | |

FOREIGN PATENT DOCUMENTS

| | | |
|---|---|---|
| CN | 109073758 A | 12/2018 |
| CN | 109975849 A | 7/2019 |
| CN | 213152072 U | 5/2021 |
| CN | 114252888 A | 3/2022 |
| CN | 114814917 A | 7/2022 |

(Continued)

*Primary Examiner* — Duc C Ho
(74) *Attorney, Agent, or Firm* — Emerson, Thomson, & Bennett, LLC; Roger D. Emerson; Matt J. Wilson (57) ABSTRACT

A method for recommending an installation position of a base station, a storage medium, a mower, and a mobile electronic device are provided. The method acquires satellite observation data at a plurality of sampling points along a boundary of a target map; determining target sampling points satisfying a preset condition according to satellite observation data at each sampling point; determining common satellite observation frequency bands according to satellite observation data at the target sampling points; determining the number of the common satellite observation frequency bands at each sampling point according to the common satellite observation frequency bands and the satellite observation data at each sampling point; and determining recommendation information of the installation position of the base station according to the number of the common satellite observation frequency bands at each sampling point.

20 Claims, 5 Drawing Sheets

(56) References Cited

FOREIGN PATENT DOCUMENTS

| | | | |
|---|---|---|---|
| EP | 3557355 | A1 | 10/2019 |
| EP | 3557359 | A1 | 10/2019 |
| JP | H06308216 | A * | 11/1994 |
| WO | WO2018108115 | A1 | 6/2018 |
| WO | WO2022100388 | A1 | 5/2022 |

* cited by examiner

FIG. 1

Ascertaining whether a carrier-to-noise ratio of satellite observation data is less than a preset carrier-to-noise ratio threshold — S201

Eliminating the satellite observation data corresponding to the carrier-to-noise ratio if the carrier-to-noise ratio of the satellite observation data is less than the preset carrier-to-noise ratio threshold; or retaining the satellite observation data corresponding to the carrier-to-noise ratio if the carrier-to-noise ratio of the satellite observation data is not less than the preset carrier-to-noise ratio threshold — S202

FIG. 2

Determining the number of satellite observation frequency bands observable at each sampling point according to satellite observation data at each sampling point — S301

Selecting top N sampling points with a largest number of observed satellite observation frequency bands for use as the target sampling points — S302

FIG. 3

Generating a to-be-analyzed file according to the number of pieces of common satellite observation data at each sampling point and a preset file format — S401

Sending the to-be-analyzed file to a user terminal, where the user terminal is used for displaying recommendation information of an installation position of a base station — S402

| Sampling point | Satellite observation frequency band | | | | | | | | | | Total observation frequency band | |
|---|---|---|---|---|---|---|---|---|---|---|---|---|
| | 1 | 2 | 3 | 4 | 5 | 6 | 7 | 8 | 9 | 10 | | |
| G | 1 |   | 1 | 1 | 1 | 1 | 1 | 1 | 1 |   | 8 | |
| F | 1 |   | 1 | 1 | 1 |   | 1 | 1 | 1 |   | 7 | Target sampling point |
| M | 1 |   | 1 |   | 1 |   | 1 |   | 1 | 1 | 6 | |
| B |   | 1 | 1 | 1 | 1 |   |   |   | 1 | 1 | 6 | |
| I |   | 1 | 1 |   |   | 1 | 1 |   | 1 |   | 5 | |
| A | 1 |   | 1 |   | 1 |   |   |   |   | 1 | 4 | |
| D | 1 |   | 1 |   | 1 |   |   | 1 |   |   | 4 | |
| E |   | 1 | 1 |   |   | 1 |   |   |   | 1 | 4 | |
| H |   | 1 |   |   |   | 1 |   | 1 | 1 |   | 4 | |
| C |   |   | 1 | 1 |   |   | 1 |   |   |   | 3 | |
| K |   | 1 | 1 |   |   |   |   | 1 |   |   | 3 | |
| J |   | 1 |   | 1 |   |   |   |   | 1 |   | 3 | |
| L | 1 |   |   |   | 1 |   |   |   |   |   | 2 | |

FIG. 5B

| Sampling point | Satellite observation frequency band | | | | | | | | | | Total observation frequency band | |
|---|---|---|---|---|---|---|---|---|---|---|---|---|
| | 1 | 2 | 3 | 4 | 5 | 6 | 7 | 8 | 9 | 10 | | |
| G | 1 | | 1 | 1 | 1 | 1 | 1 | 1 | 1 | | 8 | |
| F | 1 | | 1 | 1 | 1 | | 1 | 1 | 1 | | 7 | Target sampling point |
| M | 1 | | 1 | | 1 | | 1 | | 1 | 1 | 6 | |
| B | | 1 | 1 | 1 | 1 | | | | 1 | 1 | 6 | |
| I | | 1 | 1 | | 1 | 1 | | | 1 | | 5 | |
| Number of occurrences of each frequency band | 3 | 2 | 5 | 3 | 5 | 2 | 3 | 2 | 5 | 2 | | |

FIG. 5C

| Sampling point | Satellite observation frequency band | | | | | | | | | | Total observation frequency band |
|---|---|---|---|---|---|---|---|---|---|---|---|
| | 1 | 2 | 3 | 4 | 5 | 6 | 7 | 8 | 9 | 10 | |
| G | | | 1 | | 1 | | | | 1 | | 3 |
| F | | | 1 | | 1 | | | | 1 | | 3 |
| M | | | 1 | | 1 | | | | 1 | | 3 |
| B | | | 1 | | 1 | | | | 1 | | 3 |
| I | | | 1 | | 1 | | | | 1 | | 3 |
| A | | | 1 | | | | | | | | 1 |
| D | | | 1 | | 1 | | | | | | 2 |
| E | | | 1 | | | | | | | | 1 |
| H | | | | | | | | | 1 | | 1 |
| C | | | 1 | | | | | | | | 1 |
| K | | | 1 | | | | | | | | 1 |
| J | | | | | | | | | 1 | | 1 |
| L | | | | | 1 | | | | | | 1 |

METHOD FOR RECOMMENDING INSTALLATION POSITION OF BASE STATION, STORAGE MEDIUM, MOWER, AND MOBILE ELECTRONIC DEVICE

CROSS REFERENCE

The present application claims priority to Chinese application No. 202210650115.X filed on Jun. 10, 2022, and entitled "METHOD FOR RECOMMENDING INSTALLATION POSITION OF BASE STATION, APPARATUS FOR RECOMMENDING INSTALLATION POSITION OF BASE STATION, STORAGE MEDIUM, AND MOWER," the complete disclosure of which is expressly incorporated by reference herein.

TECHNICAL FIELD

The present disclosure relates to the technical field of communication, and in particular to, a method for recommending an installation position of a base station, a storage medium, a mower, and a mobile electronic device.

BACKGROUND

A mower is an automatic device that is convenient for a user to trim lawns and vegetation. During its working process, based on a RTK (Real-Time Kinematic) carrier phase difference technology, a fast and high-precision positioning function is realized based on synchronous satellite observation data of a base station of the mower and the mower.

When selecting an installation position of the base station, an existing mower computes and compares satellite observation signals at different positions by constantly moving positions of the base station, so as to obtain a site selection range where an obstacle is prevented from affecting communication or has little influence on communication. However, because of the need for moving the base station many times, this method is inconvenient for user operations; and does not consider influence of the installation position of the base station on RTK performance, which may lead to a problem of inaccurate positioning of the mower in a working process.

SUMMARY

In view of the above problem, embodiments of the present disclosure are presented to provide a method for recommending an installation position of a base station, an apparatus for recommending an installation position of a base station, a storage medium, and a mower, so as to at least solve the above problem.

One or more embodiments of the present disclosure provide a method for recommending an installation position of a base station, including: acquiring satellite observation data at a plurality of sampling points along a boundary of a target map, where the satellite observation data is used for indicating satellite observation frequency bands observed at each sampling point; determining target sampling points satisfying a preset condition according to satellite observation data at each sampling point; determining common satellite observation frequency bands according to satellite observation data at the target sampling points, where the common satellite observation frequency bands are the satellite observation frequency bands observable at each of the target sampling points; determining the number of the common satellite observation frequency bands at each sampling point according to the common satellite observation frequency bands and the satellite observation data at each sampling point; and determining recommendation information of the installation position of the base station according to the number of the common satellite observation frequency bands at each sampling point.

Optionally, the acquiring the satellite observation data at the plurality of sampling points along the boundary of the target map includes: arranging the sampling points at a fixed spacing along the boundary of the target map, and controlling the mower to traverse each sampling point, to acquire the satellite observation data at each sampling point.

Optionally, the satellite observation data includes a carrier-to-noise ratio, and the acquiring the satellite observation data at the plurality of sampling points in the target map includes: ascertaining whether the carrier-to-noise ratio of the satellite observation data is less than a preset carrier-to-noise ratio threshold; and eliminating the satellite observation data corresponding to the carrier-to-noise ratio if the carrier-to-noise ratio of the satellite observation data is less than the preset carrier-to-noise ratio threshold; or retaining the satellite observation data corresponding to the carrier-to-noise ratio if the carrier-to-noise ratio of the satellite observation data is not less than the preset carrier-to-noise ratio threshold.

Optionally, the determining the target sampling points satisfying the preset condition according to the satellite observation data at each sampling point includes: determining the number of satellite observation frequency bands observable at each sampling point according to the satellite observation data at each sampling point; and selecting top N sampling points with a largest number of observed satellite observation frequency bands for use as the target sampling points.

Optionally, the determining the recommendation information of the installation position of the base station according to the number of the common satellite observation frequency bands at each sampling point includes: generating a to-be-parsed file according to the number of pieces of common satellite observation data at each sampling point and a preset file format; and sending the to-be-parsed file to a user terminal, where the user terminal is used for displaying the recommendation information of the installation position of the base station.

Optionally, the method further includes: editing the boundary of the target map to obtain a new boundary of the target map; and updating the recommendation information of the installation position of the base station at each sampling point displayed on the user terminal according to the new boundary of the target map.

According to another aspect of the present disclosure, an apparatus for recommending an installation position of a base station is provided, including: a collection module configured to acquire satellite observation data at a plurality of sampling points along a boundary of a target map, where the satellite observation data is used for indicating satellite observation frequency bands observed at each sampling point; a computing module configured to determine target sampling points satisfying a preset condition according to satellite observation data at each sampling point, determine common satellite observation frequency bands according to satellite observation data at the target sampling points, where the common satellite observation frequency bands are the satellite observation frequency band observable at each of the target sampling points, and determine the number of the common satellite observation frequency bands at each sampling point according to the common satellite observation frequency bands and the satellite observation data at each sampling point; and an output module configured to determine recommendation information of the installation position of the base station according to the number of the common satellite observation frequency bands at each sampling point.

Optionally, the satellite observation data includes a carrier-to-noise ratio, and the computing module is further configured to ascertain whether the carrier-to-noise ratio of the satellite observation data is less than a preset carrier-to-noise ratio threshold; and eliminate the satellite observation data corresponding to the carrier-to-noise ratio if the carrier-to-noise ratio of the satellite observation data is less than the preset carrier-to-noise ratio threshold; or retain the satellite observation data corresponding to the carrier-to-noise ratio if the carrier-to-noise ratio of the satellite observation data is not less than the preset carrier-to-noise ratio threshold.

According to another aspect of the present disclosure, a non-transitory computer-readable storage medium storing computer instructions is provided, where the computer instructions are used for causing a computer to execute the method in the above aspects.

According to another aspect of the present disclosure, a mower is provided, including: a body, a cutterhead, and a driving wheel; one or more processors; and a memory storing a program; where the program includes instructions, and the instructions, when executed by the processor, cause the processor to execute the method in the above aspects.

According to another aspect of the present disclosure, an electronic device is provided, including: one or more processors; and a memory storing a program; where the program includes instructions, and the instructions, when executed by the processor, cause the processor to execute the method in the above aspects.

A method for recommending an installation position of a base station, an apparatus for recommending an installation position of a base station, a storage medium, and a mower provided in the present disclosure acquire satellite observation data at a plurality of sampling points along a boundary of a target map, where the satellite observation data is used for indicating satellite observation frequency bands observed at each sampling point; determine target sampling points satisfying a preset condition according to satellite observation data at each sampling point; determine common satellite observation frequency bands according to satellite observation data at the target sampling points, where the common satellite observation frequency bands are the satellite observation frequency band observable at each of the target sampling points; and determine the number of the common satellite observation frequency bands at each sampling point according to the common satellite observation frequency bands and the satellite observation data at each sampling point; and determine recommendation information of the installation position of the base station according to the number of the common satellite observation frequency bands at each sampling point, so as to recommend the installation position of the base station by moving the mower, avoid moving positions of the base station many times, facilitate user operations; and further install the base station in a region with a large number of the common satellite observation frequency bands based on the number of the common satellite observation frequency bands at each sampling point, thereby ensuring that the mower and the base station have a large number of the common satellite observation frequency bands, so that a large number of satellites can be observed by both the mower and the base station, and a better RTK positioning function is achieved.

BRIEF DESCRIPTION OF THE DRAWINGS

To more clearly describe technical schemes of embodiments of the present disclosure or existing technologies, drawings to be used in the description of the embodiments or the existing technologies will be briefly introduced below. Apparently, the drawings described below are some embodiments of the present disclosure. For those of ordinary skills in the art, other drawings may also be obtained based on these drawings without making creative work.

FIG. 5A to FIG. 5D are a schematic flowchart of the method for recommending an installation position of a base station in an example embodiment of the present disclosure;

DESCRIPTION OF REFERENCE NUMERALS

600: Apparatus for recommending an installation position of a base station; 601: collection module; 602: computing module; 603: output module; 700: electronic device; 701: computing unit; 702: ROM; 703: RAM; 704: bus; 705: input/output interface; 706: input unit; 707: output unit; 708: storage unit; and 709: communication unit.

DETAILED DESCRIPTION OF EMBODIMENTS

To enable those in the present technical field to better understand schemes of the present disclosure, technical schemes of embodiments of the present disclosure will be clearly and completely described below with reference to the drawings in the embodiments of the present disclosure. Apparently, the described embodiments are some embodiments, instead of all embodiments, of the present disclosure. All other embodiments obtained by those of ordinary skills in the art based on the embodiments of the present disclosure without making creative work are encompassed within the scope of protection of the present disclosure.

In order to facilitate understanding, before specific embodiments of the present disclosure are described in detail, an application scenario of a method for recommending an installation position of a base station, an apparatus for recommending an installation position of a base station, a storage medium, and a mower in the present disclosure will be first illustrated.

A mower is an automatic device that is convenient for a user to trim lawns and vegetation. During its working process, based on a RTK carrier phase difference technology, a fast and high-precision positioning function is realized based on synchronous satellite observation data of a base station of the mower and the mower.

When selecting an installation position of the base station, an existing mower computes and compares satellite observation signals at different positions by constantly moving positions of the base station, so as to obtain a site selection range where an obstacle is prevented from affecting communication or has little influence on communication. However, because of the need for moving the base station many times, this method is inconvenient for user operations; and does not consider influence of the installation position of the base station on RTK performance, which may lead to a problem of inaccurate positioning of the mower in a working process. In view of this, the present disclosure presents a method for recommending an installation position of a base station, an apparatus for recommending an installation position of a base station, a storage medium, and a mower, so as to solve problems existing in the above existing technology.

It should be noted that the method for recommending an installation position of a base station in the embodiments of the present disclosure may be applied to a mower terminal, or may be implemented by multi-terminal interaction and cooperation, where the multi-terminal may include the mower terminal, a mobile electronic device terminal, and the base station.

The specific embodiments of the present disclosure will be described in detail below with reference to the drawings.

Figure 1:
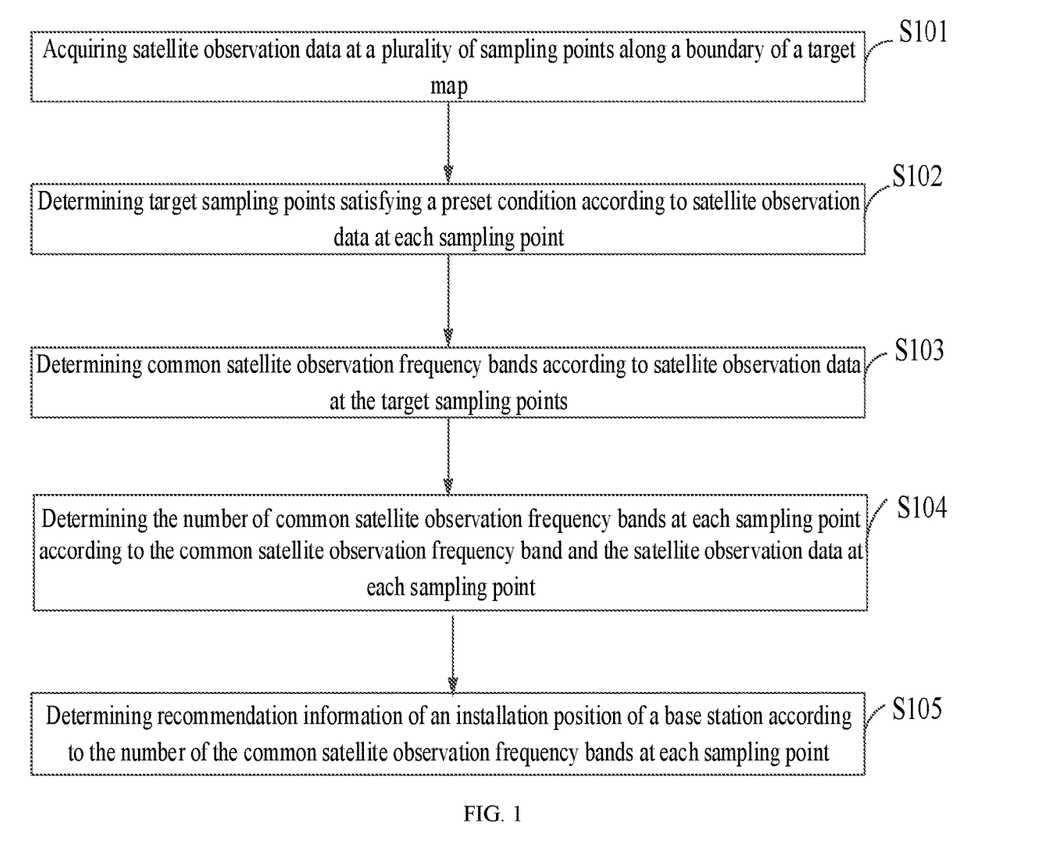
FIG. 1 is a schematic flowchart of a method for recommending an installation position of a base station in an example embodiment of the present disclosure.

FIG. 1 is a schematic flowchart of a method for recommending an installation position of a base station in an example embodiment of the present disclosure. As shown in the figure, the present embodiment mainly includes the following steps:

S101: acquiring satellite observation data at a plurality of sampling points along a boundary of a target map.

Specifically, the satellite observation data is used for indicating satellite observation frequency bands observed at each sampling point, and the satellite observation frequency bands observed at each sampling point indicate satellites observable at each sampling point. The satellite observation data may include a prn (pseudo random noise) code and a carrier-to-noise ratio, where one prn code represents one satellite. The satellites will correspond to different satellite observation data according to different satellite observation frequency bands, and the carrier-to-noise ratio represents a relationship between a carrier wave and a carrier noise. The higher the carrier-to-noise ratio is, the more reliable the signal quality is.

In a specific embodiment, the acquiring the satellite observation data at the plurality of sampling points along the boundary of the target map includes: arranging the sampling points at a fixed spacing on the boundary of the target map, and controlling a mower to traverse each sampling point, to acquire the satellite observation data at each sampling point.

Figure 5A:
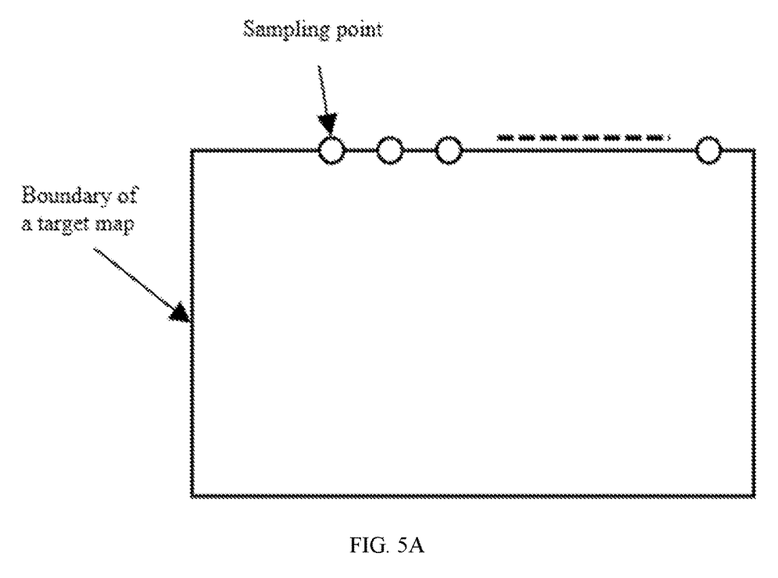

For example, referring to FIG. 5A, the constant spacing may be 0.5 m, the sampling points are arranged every 0.5 m along the boundary of the target map, and the mower is controlled to traverse each sampling point to collect the satellite observation data at each sampling point, thus collecting the satellite observation data by moving the mower, avoiding moving the base station many times, and facilitating user operations.

It should be noted that, in the present embodiment, the mower may be controlled to collect the satellite observation data while mapping, and will stop collecting the satellite observation data after the mapping is completed.

S102: determining target sampling points satisfying a preset condition according to satellite observation data at each sampling point.

Specifically, the target sampling points satisfying the preset condition may be top N sampling points where a largest number of pieces of satellite observation data are acquired among the sampling points, where N is an integer value, and may be set as required, for example, N may be 5; the number of pieces of satellite observation data at each sampling point may be computed and compared to determine the target sampling points satisfying the preset condition.

S103: determining common satellite observation frequency bands according to satellite observation data at the target sampling points.

For example, the common satellite observation frequency bands are the satellite observation frequency bands observable at each of the target sampling points. Referring to FIG. 5C, according to satellite observation data at target sampling points such as G, F, M, B, and I, satellite observation frequency bands observed at each of the target sampling points may be determined, the number/times of occurrences of each satellite observation frequency band at each of the target sampling points G, F, M, B, and I may be computed, and a satellite observation frequency band with 5 occurrences is determined for use as the common satellite observation frequency band.

S104: determining the number of common satellite observation frequency bands at each sampling point according to the common satellite observation frequency band and the satellite observation data at each sampling point.

For example, referring to FIG. 5D, according to the satellite observation data at each sampling point, the satellite observation frequency band observed at each sampling point is determined, and the number of times that the common satellite observation frequency band determined in S103 is observed at each sampling point is computed, so that the number of common satellite observation frequency bands at each sampling point can be obtained.

S105: determining recommendation information of the installation position of the base station according to the number of common satellite observation frequency bands at each sampling point.

For example, a number threshold of the common satellite observation frequency bands may be set, the number of common satellite observation frequency bands at each sampling point may be compared with a preset number threshold, a sampling point with the number of common target satellite observation frequency bands greater than the preset number threshold may be displayed as a recommended installation position, and a sampling point with the number of common target satellite observation frequency bands less than or equal to the preset number threshold may be displayed as a non-recommended installation position. The recommended installation position and the non-recommended installation position may be displayed through a thermodynamic diagram, so that a user can obtain the recommended position information more intuitively and conveniently.

To sum up, the method for recommending an installation position of a base station in the present embodiment moves the mower to recommend the installation position of the base station, thus avoiding moving positions of the base station many times, and facilitating user operations; and can further install the base station in a region with a large number of common satellite observation frequency bands based on the number of common satellite observation frequency bands at each sampling point, thereby ensuring that the mower and the base station have a large number of common satellite observation frequency bands, so that a large number of satellites can be observed by both the mower and the base station, and a better RTK positioning function is achieved.

Figure 2:
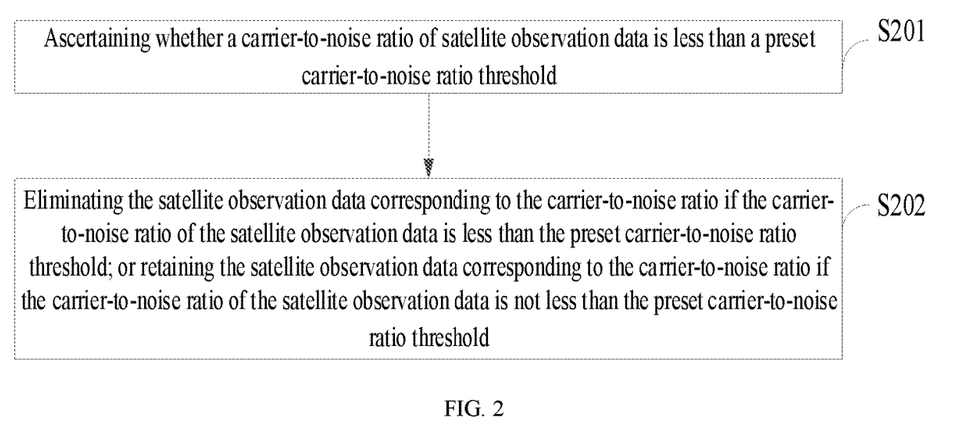
FIG. 2 is a schematic flowchart of the method for recommending an installation position of a base station in another embodiment of the present disclosure.

FIG. 2 is a schematic flowchart of the method for recommending an installation position of a base station in another example embodiment of the present disclosure. The present embodiment mainly shows a specific implementation scheme of the above step S101. As show in the figure, the present embodiment mainly includes the following steps:

S201: ascertaining whether a carrier-to-noise ratio of satellite observation data is less than a preset carrier-to-noise ratio threshold.

S202: eliminating the satellite observation data corresponding to the carrier-to-noise ratio if the carrier-to-noise ratio of the satellite observation data is less than the preset carrier-to-noise ratio threshold; or retaining the satellite observation data corresponding to the carrier-to-noise ratio if the carrier-to-noise ratio of the satellite observation data is not less than the preset carrier-to-noise ratio threshold.

Specifically, each piece of satellite observation data corresponds to a carrier-to-noise ratio. Satellite observation data with a carrier-to-noise ratio less than the preset carrier-to-noise ratio threshold means that the satellite observation data is interfered data, and may be interfered by an obstacle such as vegetation or a building. The carrier-to-noise ratio of each piece of satellite observation data is compared with the preset carrier-to-noise ratio threshold to eliminate the interfered data, thus preventing a finally recommended installation position of the base station from being affected by the obstacle, and avoiding affecting a RTK positioning function.

Figure 3:
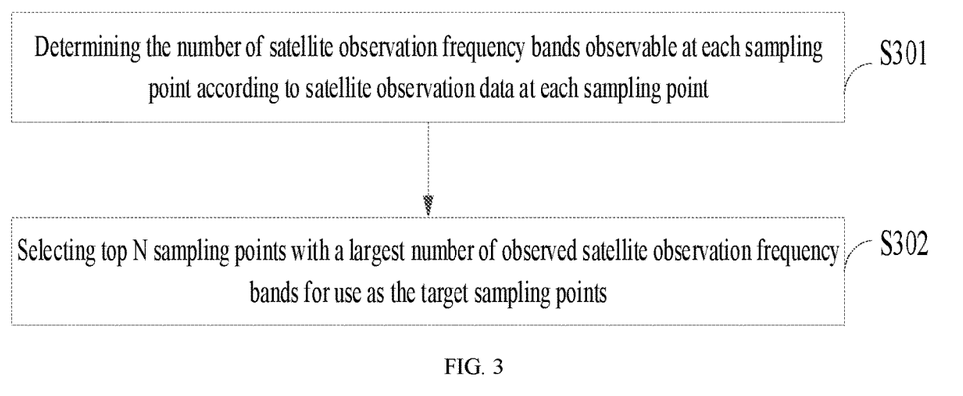
FIG. 3 is a schematic flowchart of the method for recommending an installation position of a base station in another embodiment of the present disclosure.

FIG. 3 is a schematic flowchart of the method for recommending an installation position of a base station in another example embodiment of the present disclosure. The present embodiment mainly shows a specific implementation scheme of the above step S102. As show in the figure, the present embodiment mainly includes the following steps:

S301: determining the number of satellite observation frequency bands observable at each sampling point according to satellite observation data at each sampling point.

Figure 5B:
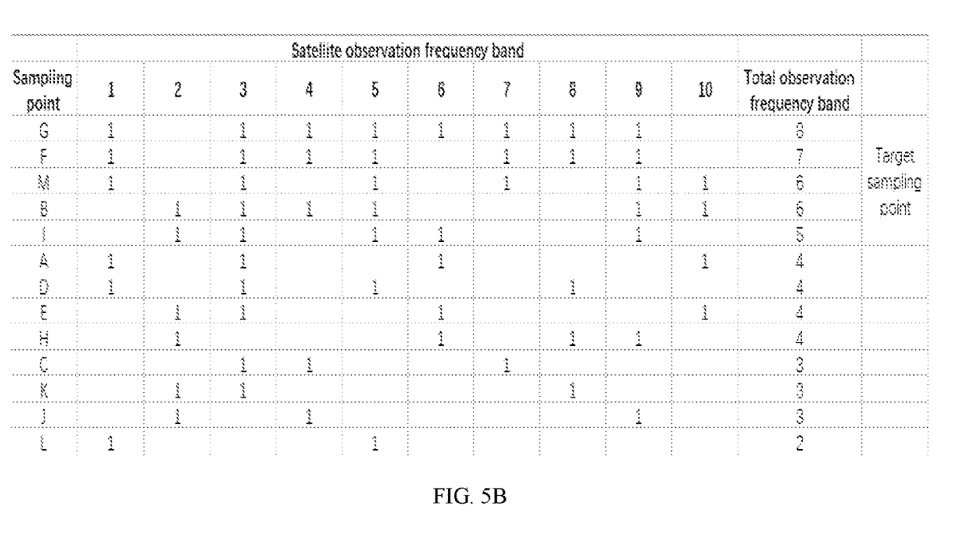

For example, referring to FIG. 5B, according to the satellite observation data at each sampling point, distribution of the satellite observation frequency bands observable at each sampling point is determined, so as to compute the number of satellite observation frequency bands observable at each sampling point.

S302: selecting top N sampling points with a largest number of observed satellite observation frequency bands for use as the target sampling points.

For example, referring to FIG. 5B, according to the number of satellite observation frequency bands observable at each sampling point, the sampling points are ranked in descending order. A ranking threshold is set. For example, the ranking threshold is 5, and sampling points ranked less than or equal to 5 are determined as the target sampling points, that is, sampling points G, M, S, I, and Q are the target sampling points. In the present embodiment, a plurality of sampling points with better observation positions among the sampling points can be determined.

Figure 4:
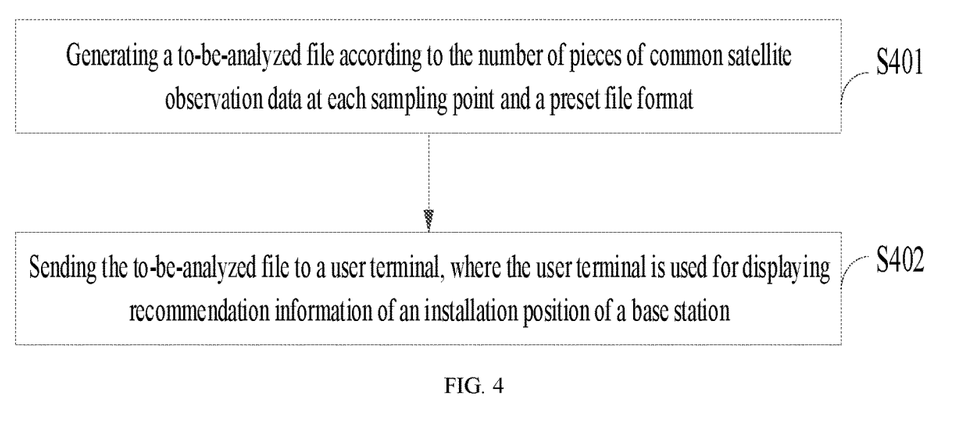
FIG. 4 is a schematic flowchart of the method for recommending an installation position of a base station in another embodiment of the present disclosure.

FIG. 4 is a schematic flowchart of the method for recommending an installation position of a base station in another example embodiment of the present disclosure. The present embodiment mainly shows a specific implementation scheme of the above step S105. As show in the figure, the present embodiment mainly includes the following steps:

S401: generating a to-be-parsed file according to the number of pieces of common satellite observation data at each sampling point and a preset file format.

For example, the preset file format may be determined according to software with which a user terminal displays the file, for example, the file may be a json file, which is not limited in the present embodiment.

S402: sending the to-be-parsed file to a user terminal, where the user terminal is used for displaying recommendation information of the installation position of the base station.

For example, the to-be-parsed file may be uploaded to the user terminal through Bluetooth, and the user terminal may display the recommendation information of the installation position of the base station through a thermodynamic diagram, and the recommendation information of the installation information of the base station may include a recommended installation position and a non-recommended installation position.

In a specific embodiment, the user terminal parses the to-be-parsed file to obtain the number of common satellite observation frequency bands at each sampling point; compares the number of common satellite observation frequency bands at each sampling point with a preset number threshold; displays a sampling point with the number of common target satellite observation frequency bands greater than the preset number threshold as a recommended installation position, and displays a sampling point with the number of common target satellite observation frequency bands less than or equal to the preset number threshold as a non-recommended installation position.

For example, the preset number threshold may be set as 60, a sampling point with the number of common target satellite observation frequency bands greater than 60 is displayed as a recommended installation position, and a sampling point with the number of common target satellite observation frequency bands less than or equal to 60 is displayed as a non-recommended installation position, and the recommended installation position and the non-recommended installation position may be displayed using different colors. For example, green may be set to represent the recommended installation position; yellow may be set to represent the non-recommended installation position, and a current installation position of the base station may also be displayed, for example, a red five-pointed star may be used to represent the current installation position of the base station.

Through the above steps of the present embodiment, a user can intuitively obtain the recommendation information of the installation position of the base station, thus improving the user experience.

In a specific embodiment, the method further includes: editing a boundary of a target map to obtain a new boundary of the target map; and updating the recommendation information of the installation position of the base station at each sampling point displayed on the user terminal according to the new boundary of the target map.

For example, a partial boundary of the target map is deleted, the satellite observation data at each sampling point is re-processed as mentioned in the above embodiments, so as to obtain recommendation information of a new installation position of the base station, and display the recommendation information of the new installation position of the base station.

Figure 6:
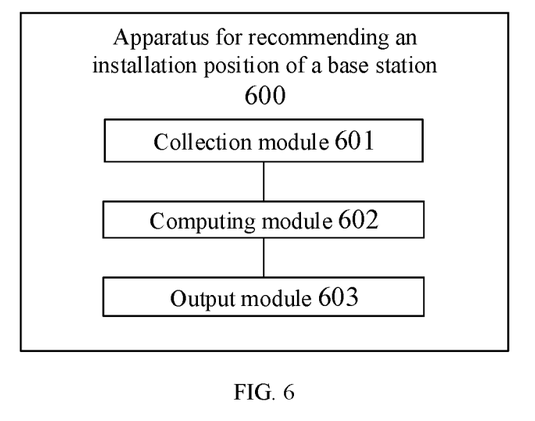
FIG. 6 is a structural block diagram of an apparatus for recommending an installation position of a base station in an example embodiment of the present disclosure.

FIG. 6 is a structural block diagram of an apparatus for recommending an installation position of a base station in an example embodiment of the present disclosure.

The apparatus 600 for recommending an installation position of a base station in the present embodiment may be installed in a mower, where the mower may be adapted to executing a task of recommending the installation position of the base station.

As shown in the figure, the apparatus 600 for recommending an installation position of a base station in the present embodiment mainly includes: a collection module 601, a computing module 602, and an output module 603.

The collection module 601 is configured to acquire satellite observation data at a plurality of sampling points along a boundary of a target map, where the satellite observation data is used for indicating satellite observation frequency bands observed at each sampling point.

The computing module 602 is configured to determine target sampling points satisfying a preset condition according to satellite observation data at each sampling point; determine common satellite observation frequency bands according to satellite observation data at the target sampling points, where the common satellite observation frequency bands are the satellite observation frequency bands observable at each of the target sampling points; and determine the number of common satellite observation frequency bands at each sampling point according to the common satellite observation frequency band and the satellite observation data at each sampling point.

The output module 603 is configured to determine recommendation information of the installation position of the base station according to the number of common satellite observation frequency bands at each sampling point.

Optionally, the satellite observation data includes a carrier-to-noise ratio, and the computing module 602 is further configured to ascertain whether the carrier-to-noise ratio of the satellite observation data is less than a preset carrier-to-noise ratio threshold; and eliminate the satellite observation data corresponding to the carrier-to-noise ratio if the carrier-to-noise ratio of the satellite observation data is less than the preset carrier-to-noise ratio threshold; or retain the satellite observation data corresponding to the carrier-to-noise ratio if the carrier-to-noise ratio of the satellite observation data is not less than the preset carrier-to-noise ratio threshold.

In addition, the apparatus 600 for recommending an installation position of a base station in an embodiment of the present disclosure is further configured to implement other steps in the above embodiments of the method for recommending an installation position of a base station, and has the beneficial effects of the corresponding steps of the method in the embodiments, which will not be repeated here.

An example embodiment of the present disclosure further provides a non-transitory computer-readable storage medium storing computer instructions, where the computer instructions are used for causing a computer to execute the method in the embodiments of the present disclosure.

An example embodiment of the present disclosure further provides a computer program product, including a computer program, where the computer program, when executed by a processor of a computer, causes the computer to execute the method in the embodiments of the present disclosure.

An example embodiment of the present disclosure further provides a mower, including: a body, a cutterhead, and a driving wheel; one or more processors; and a memory storing a program; where the program includes instructions, and the instructions, when executed by the processor, cause the processor to execute the method in the embodiments of the present disclosure.

An example embodiment of the present disclosure further provides an electronic device, including: one or more processors; and a memory storing a program; where the program includes instructions, and the instructions, when executed by the processor, cause the processor to execute the method in the embodiments of the present disclosure.

Figure 7:
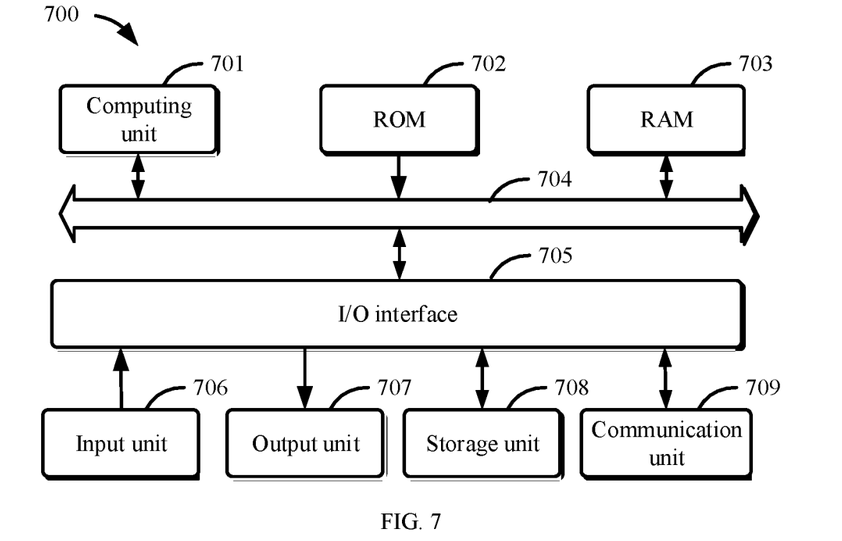
FIG. 7 is a structural block diagram of an electronic device in an example embodiment of the present disclosure.

Referring to FIG. 7, a structural block diagram of an electronic device 700 that can serve as a server or a client of the present disclosure will now be described, which is an example of a hardware device that can be applied to various aspects of the present disclosure. The electronic device is intended to represent various forms of electronic digital computing devices, such as a laptop computer, a desktop computer, a workbench, a personal digital assistant, a server, a blade server, a mainframe computer, and other suitable computers. The electronic device may further represent various forms of mobile apparatuses, such as a personal digital assistant, a cellular phone, a smart phone, a wearable device, and other similar computing apparatuses. The components shown herein, the connections and relationships thereof, and the functions thereof are merely used as examples, and are not intended to limit implementations of the present disclosure described and/or claimed herein.

As shown in FIG. 7, the electronic device 700 includes a computing unit 701, which may execute various appropriate actions and processes in accordance with a computer program stored in a read-only memory (ROM) 702 or a computer program loaded into a random-access memory (RAM) 703 from a storage unit 708. The RAM 703 may further store various programs and data required by operations of the device 700. The computing unit 701, the ROM 702, and the RAM 703 are connected to each other through a bus 704. An input/output (I/O) interface 705 is also connected to the bus 704.

A plurality of components in the electronic device 700 is connected to the I/O interface 705, including: an input unit 706, an output unit 707, a storage unit 708, and a communication unit 709. The input unit 706 may be any type of device capable of inputting information to the electronic device 700, and the input unit 706 may receive inputted digital information or character information, and generate key signal input related to user settings and/or function control of the electronic device. The output unit 707 may be any type of device capable of presenting information, and may include, but is not limited to, a display, a speaker, a video/audio output terminal, a vibrator, and/or a printer. The storage unit 704 may include, but is not limited to, a magnetic disk and an optical disk. The communication unit 709 allows the electronic device 700 to exchange information/data with other devices through a computer network such as the Internet and/or various telecommunication networks, and may include, but is not limited to, a modem, a network card, an infrared communication device, a wireless communication transceiver and/or a chipset, such as a Bluetooth™ device, a WiFi device, a WiMax device, a cellular communication device, and/or an analog.

The computing unit 701 may be various general-purpose and/or special-purpose processing components having a processing power and a computing power. Some examples of the computing unit 701 include, but are not limited to, a central processing unit (CPU), a graphics processing unit (GPU), various special-purpose artificial intelligence (AI) computing chips, various computing units running a machine learning model algorithm, a digital signal processor (DSP), and any appropriate processor, controller, microcontroller, and the like. The computing unit 701 executes various methods and processes described above. For example, in some embodiments, the method for cleaning a swimming pool in the above embodiments may be implemented as a computer software program that is tangibly included in a machine-readable medium, such as the storage unit 708. In some embodiments, some or all of the computer programs may be loaded and/or installed onto the electronic device 700 via the ROM 702 and/or the communication unit 709. In some embodiments, the computing unit 701 may be configured to execute the method for cleaning a swimming pool by any other appropriate approach (e.g., by means of firmware).

Program codes for implementing the method of the present disclosure may be compiled using any combination of one or more programming languages. The program codes may be provided to a processor or controller of a general-purpose computer, a special-purpose computer, or other programmable data processing apparatuses, such that the program codes, when executed by the processor or controller, cause the functions/operations specified in the flow charts and/or block diagrams to be implemented. The program codes may be completely executed on a machine, partially executed on a machine, partially executed as a separate software package on a machine and partially executed on a remote machine, or completely executed on a remote machine or server.

In the context of the present disclosure, the machine-readable medium may be a tangible medium which may contain or store a program for use by, or used in combination with, an instruction execution system, apparatus or device. The machine-readable medium may be a machine-readable signal medium or a machine-readable storage medium. The machine-readable medium may include, but is not limited to, electronic, magnetic, optical, electromagnetic, infrared, or semiconductor systems, apparatuses, or devices, or any appropriate combination of the above. A more specific example of the machine-readable storage medium will include an electrical connection based on one or more pieces of wire, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any appropriate combination of the above.

As used in the present disclosure, the terms "machine-readable medium" and "computer-readable medium" refer to any computer program product, device, and/or apparatus (e.g., a magnetic disk, an optical disk, a memory, or a programmable logic device (PLD)) configured to provide machine instructions and/or data to a programmable processor, and include a machine-readable medium receiving machine instructions as machine-readable signals. The term "machine-readable signal" refers to any signal used to provide machine instructions and/or data to a programmable processor.

To provide interaction with a user, the systems and technologies described herein may be implemented on a computer that is provided with: a display apparatus (e.g., a CRT (cathode ray tube) or a LCD (liquid crystal display) monitor) configured to display information to the user; and a keyboard and a pointing apparatus (e.g., a mouse or a trackball) by which the user can provide an input to the computer. Other kinds of apparatuses may be further configured to provide interaction with the user. For example, a feedback provided to the user may be any form of sensory feedback (e.g., visual feedback, auditory feedback, or haptic feedback); and an input may be received from the user in any form (including an acoustic input, a voice input, or a tactile input).

The systems and technologies described herein may be implemented in a computing system (e.g., as a data server) that includes a back-end component, or a computing system (e.g., an application server) that includes a middleware component, or a computing system (e.g., a user computer with a graphical user interface or a web browser through which the user can interact with an implementation of the systems and technologies described herein) that includes a front-end component, or a computing system that includes any combination of such a back-end component, such a middleware component, or such a front-end component. The components of the system may be interconnected by digital data communication (e.g., a communication network) in any form or medium. Examples of the communication network include: a local area network (LAN), a wide area network (WAN), and the Internet.

The computer system may include a client and a server. The client and the server are generally remote from each other, and usually interact via a communication network. A relationship between the client and the server arises by virtue of computer programs that run on corresponding computers and have a client-server relationship with each other.

It should be noted that, in the description of the present disclosure, the terms "first" and "second" are only used for ease of description of different components or names, and cannot be understood as indicating or implying sequential relationship and relative importance or implicitly indicating the number of indicated technical features. Thus, features defined with "first" or "second" may explicitly or implicitly include at least one of the features.

Unless otherwise defined, all technical terms and scientific terms used herein have the same meaning as commonly understood by those skilled in the technical field of the present disclosure. The terms used herein in the description of the present disclosure are only for the purpose of describing specific embodiments, and are not intended to limit the present disclosure.

It should be noted that, the specific embodiments of the present disclosure are described in detail with reference to the drawings, but should not be understood as imposing any limitation on the scope of protection of the present disclosure. Within the scope described in the claims, various alterations and modifications that can be made by those skilled in the art without making creative work are still encompassed within the scope of protection of the present disclosure.

The examples of the embodiments of the present disclosure are intended to simply illustrate the technical features of the embodiments of the present disclosure, so that those skilled in the art can intuitively understand the technical features of the embodiments of the present disclosure, which are not used to impose any improper limitation on the embodiments of the present disclosure.

Finally, it should be noted that: the above embodiments are merely used to illustrate the technical schemes of the present disclosure, instead of imposing any limitation on the technical schemes. While the present disclosure is described in detail with reference to the above embodiments, those of ordinary skills in the art should understand that: the technical schemes disclosed in the above embodiments may still be modified or a part of the technical features thereof may be replaced equivalently. These modifications or replacements are not intended to make the essence of corresponding technical schemes depart from the spirit and scope of the technical schemes of the embodiments of the present disclosure.

The invention claimed is:

1. A method for recommending an installation position of a base station, comprising:
   acquiring satellite observation data at a plurality of sampling points along a boundary of a target map, wherein the satellite observation data is used for indicating satellite observation frequency bands observed at each of the sampling points;
   determining target sampling points satisfying a preset condition according to the satellite observation data at the each sampling point;
   determining common satellite observation frequency bands according to satellite observation data at the target sampling points, wherein the common satellite observation frequency bands are the satellite observation frequency bands observable at each of the target sampling points;
   determining a number of the common satellite observation frequency bands at each target sampling point according to the common satellite observation frequency bands and the satellite observation data at each sampling point; and
   determining recommendation information of the installation position of the base station according to the number of the common satellite observation frequency bands at each target sampling point.

2. The method according to claim 1, wherein the acquiring the satellite observation data at the plurality of sampling points along the boundary of the target map comprises:
   arranging the sampling points at a fixed spacing along the boundary of the target map, and controlling a mower to traverse the each sampling point, to acquire the satellite observation data at the each sampling point.

3. The method according to claim 1, wherein the satellite observation data comprises a carrier-to-noise ratio, and the acquiring the satellite observation data at the plurality of sampling points in the target map comprises:
   ascertaining whether the carrier-to-noise ratio of the satellite observation data is less than a preset carrier-to-noise ratio threshold; and
   eliminating the satellite observation data corresponding to the carrier-to-noise ratio when the carrier-to-noise ratio of the satellite observation data is less than the preset carrier-to-noise ratio threshold; or
   retaining the satellite observation data corresponding to the carrier-to-noise ratio when the carrier-to-noise ratio of the satellite observation data is not less than the preset carrier-to-noise ratio threshold.

4. The method according to claim 1, wherein the determining the target sampling points satisfying the preset condition according to the satellite observation data at the each sampling point comprises:
   determining the number of the satellite observation frequency bands observable at the each sampling point according to the satellite observation data at each sampling point; and
   selecting top N sampling points with the largest number of observed satellite observation frequency bands for use as the target sampling points.

5. The method according to claim 1, wherein the determining the recommendation information of the installation position of the base station according to the number of the common satellite observation frequency bands at the each sampling point comprises:
   generating a to-be-parsed file according to a number of pieces of common satellite observation data at the each sampling point and a preset file format; and
   sending the to-be-parsed file to a user terminal, wherein the user terminal is used for displaying the recommendation information of the installation position of the base station.

6. The method according to claim 5, wherein the method further comprises:
   editing the boundary of the target map to obtain a new boundary of the target map; and
   updating the recommendation information of the installation position of the base station at each sampling point displayed on the user terminal according to the new boundary of the target map.

7. The method according to claim 6, wherein a recommended installation position and a non-recommended installation position are displayed using different colors on the user terminal.

8. A non-transitory computer-readable storage medium storing computer instructions, wherein the computer instructions are used for causing a computer to execute the method according to claim 1.

9. A mower, comprising:
   a body, a cutterhead, and a driving wheel;
   one or more processors; and
   a memory storing a program;
   wherein the program comprises instructions, and the instructions, when executed by the processor, cause the processor to execute a method for recommending an installation position of a base station, the method comprising:
   acquiring satellite observation data at a plurality of sampling points along a boundary of a target map, wherein the satellite observation data is used for indicating satellite observation frequency bands observed at each of the sampling points;
   determining target sampling points satisfying a preset condition according to the satellite observation data at the each sampling point;
   determining common satellite observation frequency bands according to satellite observation data at the target sampling points, wherein the common satellite observation frequency bands are the satellite observation frequency bands observable at each of the target sampling points;
   determining a number of the common satellite observation frequency bands at each target sampling point according to the common satellite observation frequency bands and the satellite observation data at each target sampling point; and
   determining recommendation information of the installation position of the base station according to the number of the common satellite observation frequency bands at each target sampling point.

10. The mower according to claim 9, wherein the acquiring the satellite observation data at the plurality of sampling points along the boundary of the target map comprises:
    arranging the sampling points at a fixed spacing along the boundary of the target map, and controlling a mower to traverse the each sampling point, to acquire the satellite observation data at the each sampling point.

11. The mower according to claim 9, wherein the satellite observation data comprises a carrier-to-noise ratio, and the acquiring the satellite observation data at the plurality of sampling points in the target map comprises:
  ascertaining whether the carrier-to-noise ratio of the satellite observation data is less than a preset carrier-to-noise ratio threshold; and
  eliminating the satellite observation data corresponding to the carrier-to-noise ratio when the carrier-to-noise ratio of the satellite observation data is less than the preset carrier-to-noise ratio threshold; or
  retaining the satellite observation data corresponding to the carrier-to-noise ratio when the carrier-to-noise ratio of the satellite observation data is not less than the preset carrier-to-noise ratio threshold.

12. The mower according to claim 9, wherein the determining the target sampling points satisfying the preset condition according to the satellite observation data at the each sampling point comprises:
  determining a number of satellite observation frequency bands observable at the each sampling point according to the satellite observation data at the each sampling point; and
  selecting top N sampling points with a largest number of observed satellite observation frequency bands for use as the target sampling points.

13. The mower according to claim 9, wherein the determining the recommendation information of the installation position of the base station according to the number of the common satellite observation frequency bands at the each sampling point comprises:
  generating a to-be-parsed file according to a number of pieces of common satellite observation data at the each sampling point and a preset file format; and
  sending the to-be-parsed file to a user terminal, wherein the user terminal is used for displaying the recommendation information of the installation position of the base station.

14. The mower according to claim 13, wherein the method further comprises:
  editing the boundary of the target map to obtain a new boundary of the target map; and
  updating the recommendation information of the installation position of the base station at the each sampling point displayed on the user terminal according to the new boundary of the target map.

15. The mower according to claim 14, wherein a recommended installation position and a non-recommended installation position are displayed using different colors on the user terminal.

16. The mower according to claim 9, wherein the acquiring the satellite observation data at the plurality of sampling points along the boundary of the target map comprises:
arranging the plurality of sampling points at a fixed spacing along the boundary of the target map, and controlling the mower to traverse the each sampling point, to acquire the satellite observation data at the each sampling point.

17. A mobile electronic device, comprising: one or more processors; and a memory storing a program; wherein the program comprises instructions, and the instructions, when executed by the processor, cause the processor to execute a method for recommending an installation position of a base station, the method comprising:
  acquiring satellite observation data at a plurality of sampling points along a boundary of a target map, wherein the satellite observation data is used for indicating satellite observation frequency bands observed at each of the sampling points;
  determining target sampling points satisfying a preset condition according to the satellite observation data at the each sampling point;
  determining common satellite observation frequency bands according to satellite observation data at the target sampling points, wherein the common satellite observation frequency bands are the satellite observation frequency band observable at each of the target sampling points;
  determining a number of the common satellite observation frequency bands at the each sampling point according to the common satellite observation frequency bands and the satellite observation data at the each sampling point; and
  determining recommendation information of the installation position of the base station according to the number of the common satellite observation frequency bands at the each sampling point.

18. The mobile electronic device according to claim 17, wherein the acquiring the satellite observation data at the plurality of sampling points along the boundary of the target map comprises:
  arranging the sampling points at a fixed spacing along the boundary of the target map, and controlling a mower to traverse the each sampling point, to acquire the satellite observation data at the each sampling point.

19. The mobile electronic device according to claim 17, wherein the satellite observation data comprises a carrier-to-noise ratio, and the acquiring the satellite observation data at the plurality of sampling points in the target map comprises:
  ascertaining whether the carrier-to-noise ratio of the satellite observation data is less than a preset carrier-to-noise ratio threshold; and
  eliminating the satellite observation data corresponding to the carrier-to-noise ratio when the carrier-to-noise ratio of the satellite observation data is less than the preset carrier-to-noise ratio threshold; or
  retaining the satellite observation data corresponding to the carrier-to-noise ratio when the carrier-to-noise ratio of the satellite observation data is not less than the preset carrier-to-noise ratio threshold.

20. The mobile electronic device according to claim 17, wherein the determining the target sampling points satisfying the preset condition according to the satellite observation data at the each sampling point comprises:
  determining a number of satellite observation frequency bands observable at the each sampling point according to the satellite observation data at the each sampling point; and
  selecting top N sampling points with a largest number of observed satellite observation frequency bands for use as the target sampling points.

\* \* \* \* \*